No. 685,584. Patented Oct. 29, 1901.
T. DOUGLAS.
APPARATUS FOR COOLING AIR.
(Application filed Jan. 21, 1901.)

(No Model.) 5 Sheets—Sheet 1.

No. 685,584. Patented Oct. 29, 1901.
T. DOUGLAS.
APPARATUS FOR COOLING AIR.
(Application filed Jan. 21, 1901.)

(No Model.) 5 Sheets—Sheet 2.

No. 685,584. Patented Oct. 29, 1901.
T. DOUGLAS.
APPARATUS FOR COOLING AIR.
(Application filed Jan. 21, 1901.)

(No Model.) 5 Sheets—Sheet 3.

No. 685,584. Patented Oct. 29, 1901.
T. DOUGLAS.
APPARATUS FOR COOLING AIR.
(Application filed Jan. 21, 1901.)
(No Model.) 5 Sheets—Sheet 4.
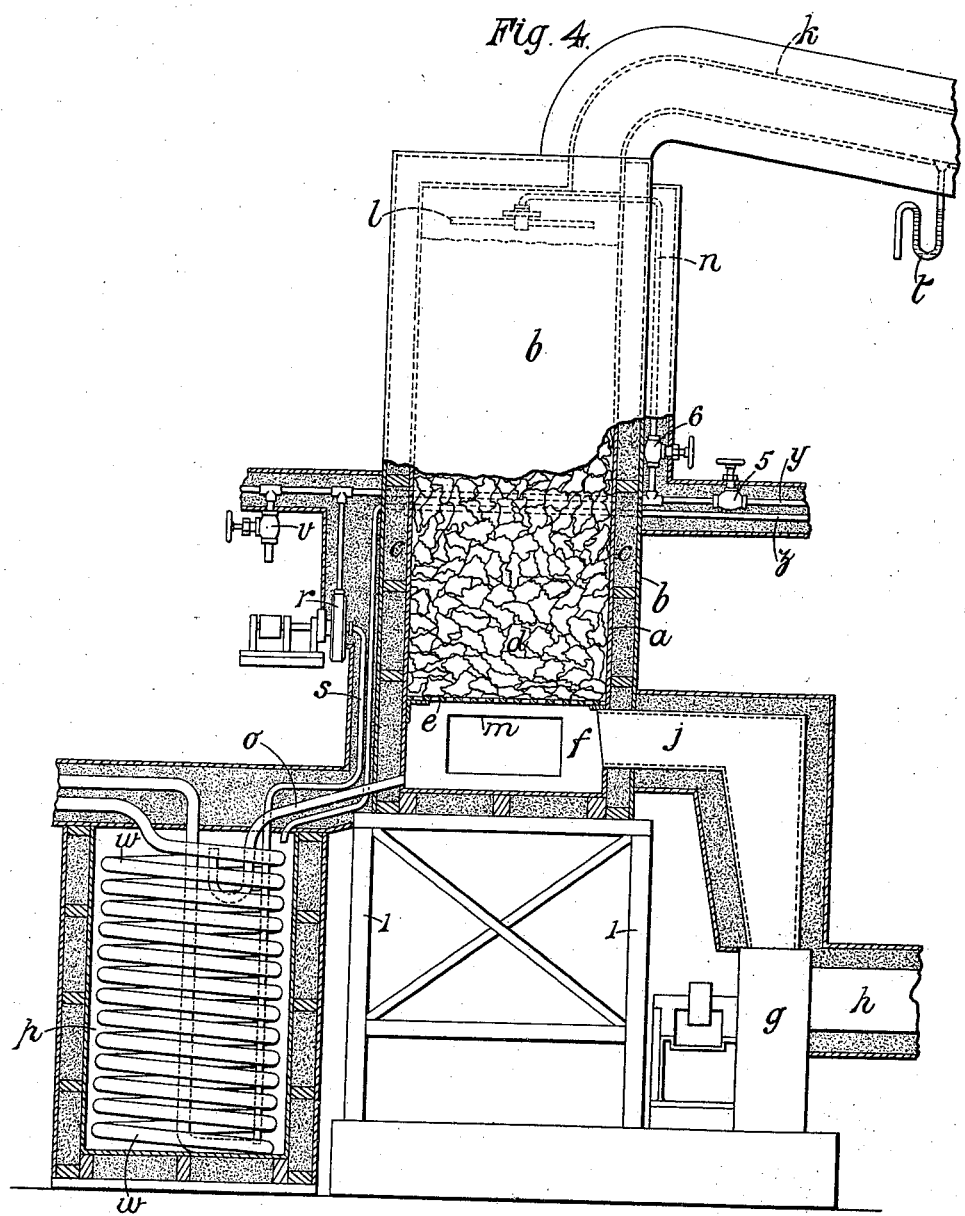

No. 685,584. Patented Oct. 29, 1901.
T. DOUGLAS.
APPARATUS FOR COOLING AIR.
(Application filed Jan. 21, 1901.)
(No Model.) 5 Sheets—Sheet 5.
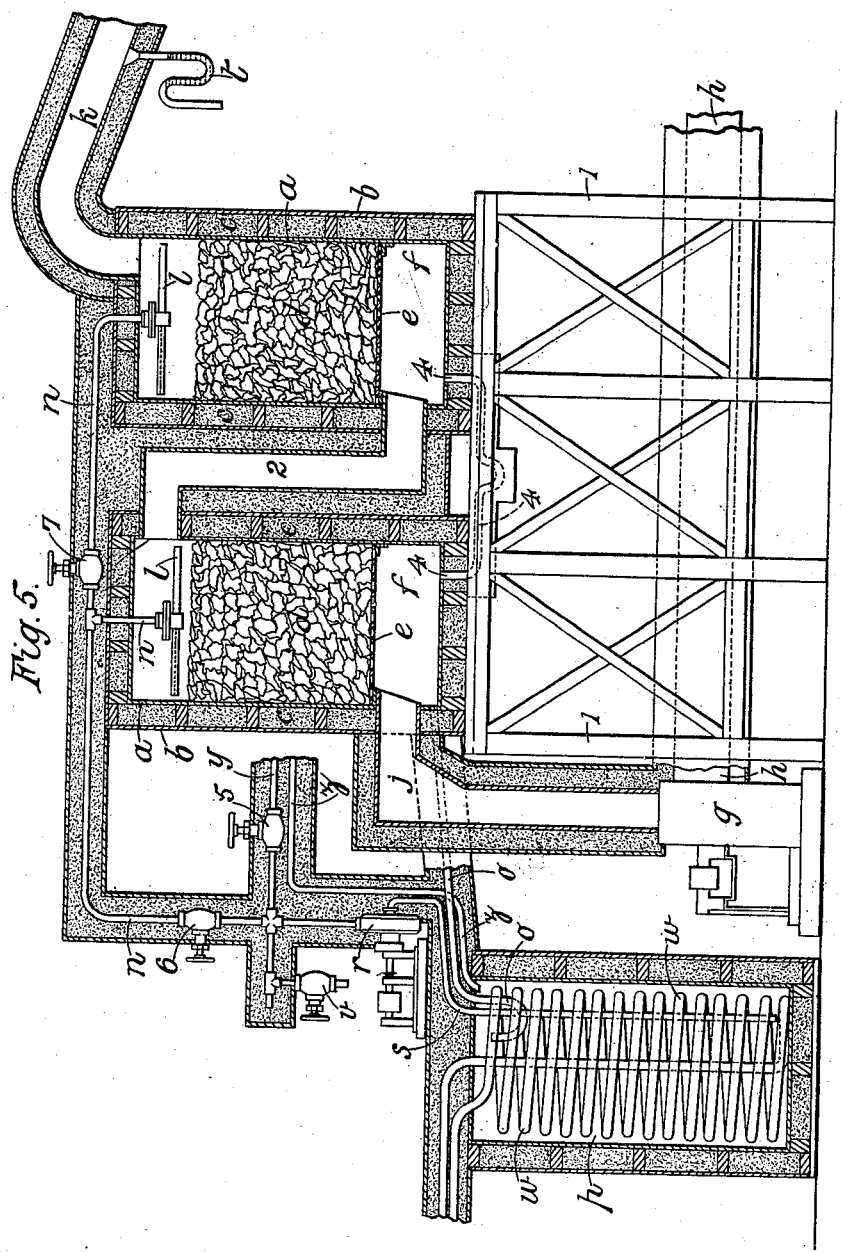
THE NORRIS PETERS CO., PHOTO-LITHO., WASHINGTON, D. C.

ated October 29, 1901.

UNITED STATES PATENT OFFICE.

THOMAS DOUGLAS, OF LONDON, ENGLAND.

APPARATUS FOR COOLING AIR.

SPECIFICATION forming part of Letters Patent No. 685,584, dated October 29, 1901.

Application filed January 21, 1901. Serial No. 44,089. (No model.)

*To all whom it may concern:*

Be it known that I, THOMAS DOUGLAS, a subject of the Queen of Great Britain, residing at London, England, have invented certain new and useful Improvements in Apparatus for Cooling Air, of which the following is a specification.

My invention relates to apparatus for cooling air and is intended for use in connection with refrigerating plants. My said cooling apparatus comprises a tower (in some cases two or more connected towers) having an inlet near the bottom for admitting the air to be cooled and an outlet near the top for the exit of the cooled air. The tower is filled with broken coke or like porous material, of irregular sizes and shapes, resting upon a grating or the like near the bottom, and at the top of the tower is a distributer for delivering brine or other cooling liquid and spreading the same in fine streams over the coke. The cooling liquid trickles down over the coke and finally collects in the bottom of the tower, whence it is passed to the evaporator of the refrigerating plant and afterward again pumped up and circulated through the cooling-tower. In some instances the cooling liquid is drawn off into an intermediate tank or reservoir before being passed to the evaporator. In other instances the chamber in the bottom of the tower is made sufficiently large to serve as a reservoir for the cooling liquid, in which case the intermediate tank is dispensed with. I sometimes place the evaporator in the reservoir for the cooling liquid. The air to be cooled may be blown into the tower by a fan, or it may be drawn through it. In passing upward through and between the pieces of coke the air meets the descending brine or other cooling liquid and is cooled by direct contact therewith. The cooling is very efficient because of such direct contact and because of the ascending air and descending cooling liquid being broken up into very fine streams which insures intimate mixture thereof.

Figure 1:
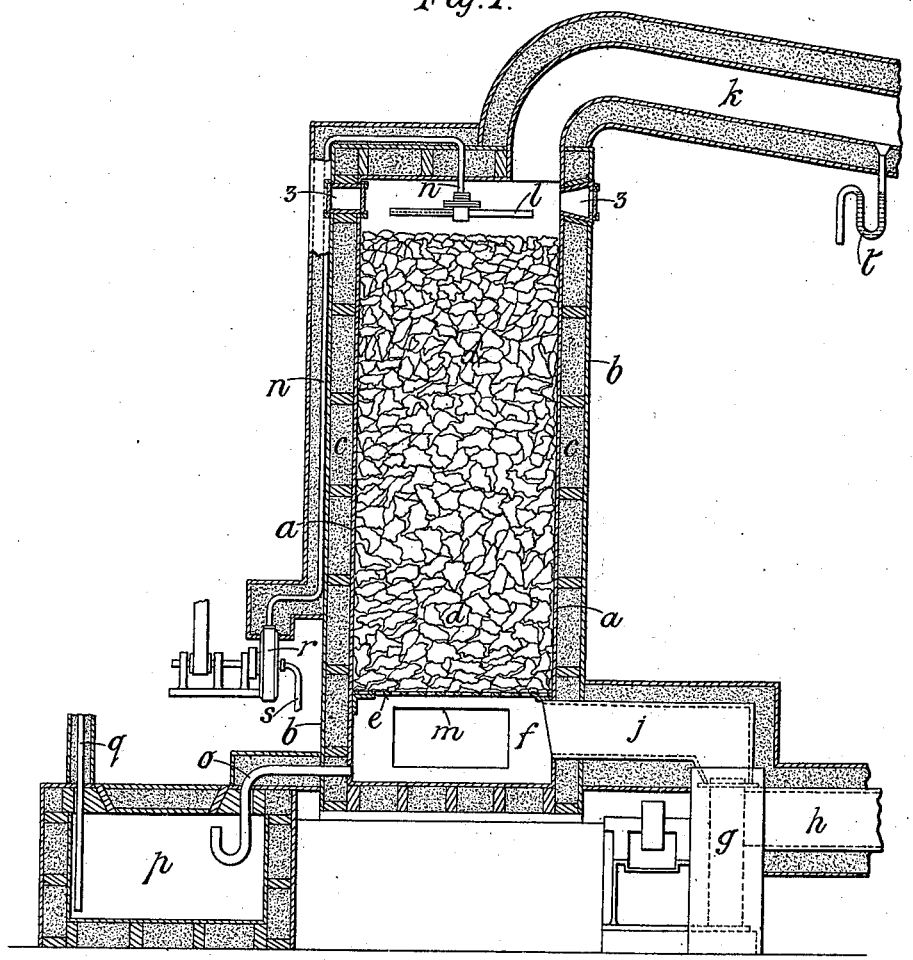
Figure 2:
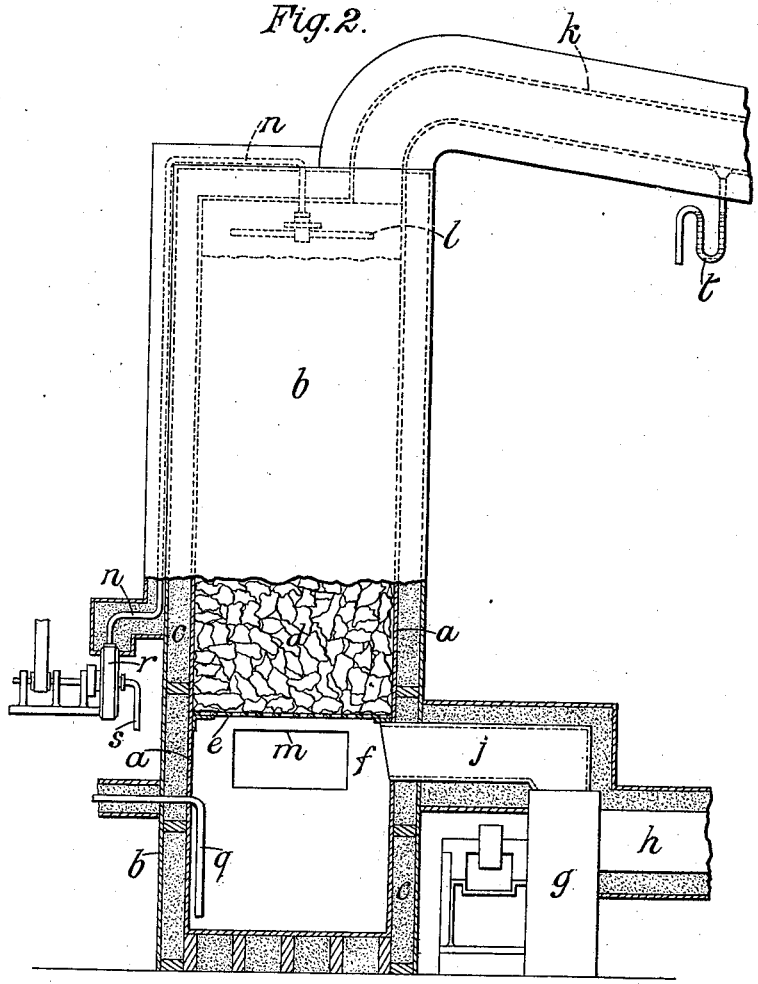
Figure 3:
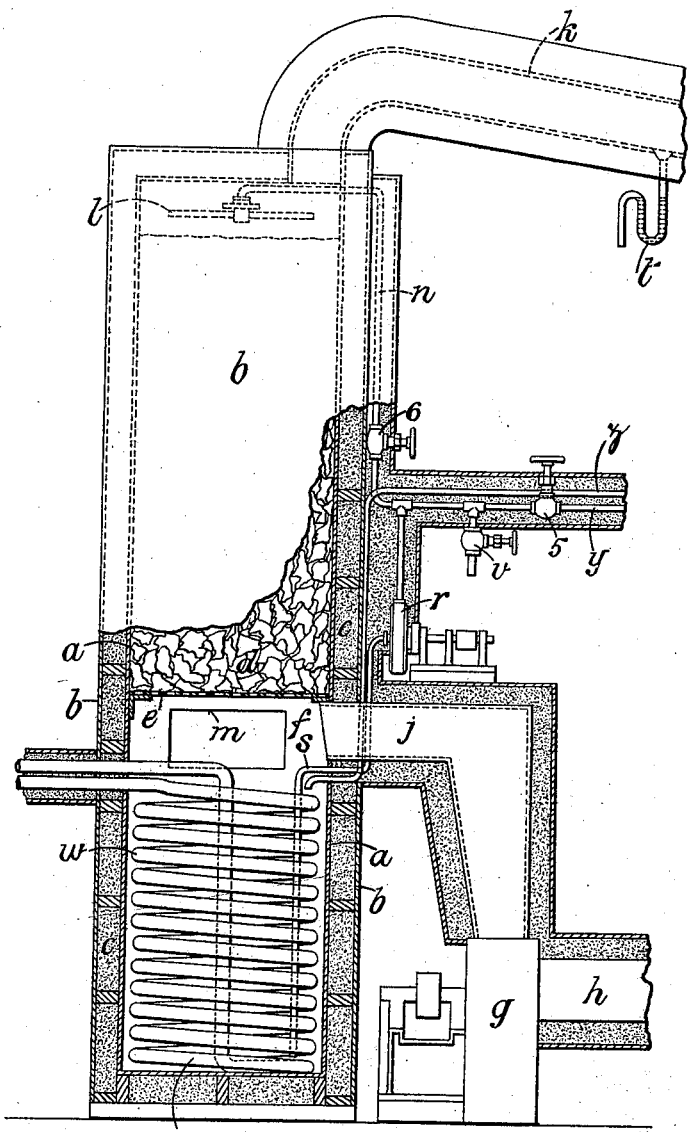

Referring to the accompanying drawings, which illustrate several forms of my invention, Figures 1 and 5 are in vertical central section, and Figs. 2 to 4 in sectional elevation.

*a* is the cooling-tower, consisting, for example, of an iron shell of any suitable shape in cross-section and inclosed by an outer casing *b*, between which and the tower proper is an insulation-cavity *c* to prevent the transmission of heat to the interior of the tower. This space or cavity is preferably packed with a suitable non-conductor of heat—such as silicate cotton, cork, charcoal, hair, or the like—to further improve the insulation.

*d d* are pieces of coke or like porous material, of irregular sizes and shapes, supported on a grating *e*. Beneath this grating is an air-distributing chamber *f*, provided with a manhole *m*.

*g* is a fan drawing air from a suction-trunk *h* and discharging same through a delivery-pipe *j* into the chamber *f*, which chamber insures that the air will be equally distributed through the tower. The suction-trunk *h* will in the case of a refrigerating plant communicate with the refrigerating-chamber.

At the top of the tower is the cold-air delivery-trunk *k*, leading to the refrigerating-chamber. The said delivery-trunk, as well as the fan and connected parts, is incased with a good non-conductor of heat.

*t* is a trap to collect any cooling liquid which may pass over with the air into the delivery-trunk.

The device for distributing the brine or other cooling liquid may conveniently consist of a perforated pipe *l*, mounted with a capability of revolving on the brine-delivery pipe *n*, one half of the pipe *l* being provided with a number of small holes on one side thereof and the other half with holes on the other side thereof, so that the reaction of the jets of liquid issuing from said holes will in a well-known manner cause the pipe to revolve, and thus deliver the cooling liquid uniformly over the whole surface of the coke. The pipe is shown straight, but it may be curved. I may use any other known or suitable means for distributing the cooling liquid over the surface of the coke. For example, I may use a cone or a series of lutes or channels.

The liquid on reaching the bottom of the tower in the example shown in Fig. 1 passes out through a drain-pipe *o* into a collecting tank or reservoir *p*, said pipe *o* being bent, as shown, to form a seal, which prevents the escape of air through said pipe. The cooling liquid is pumped from the tank $p$ through a pipe $q$ into the evaporator-chamber of the refrigerating plant. In this form of my invention the tank $p$ is intermediate between the tower and the evaporator; but I may simplify the construction by combining said tank with the tower, as shown in Fig. 2—that is to say, by deepening the tower I make the lower part of it serve as the brine-reservoir. In the further modification shown in Fig. 3 the evaporator-coil $w$ is placed within the reservoir for the cooling liquid at the bottom of the tower, so that a separate evaporating-chamber is not required. The cooling liquid is in all the arrangements drawn from the evaporator-chamber through the suction-pipe $s$ by a pump $r$ and is delivered through the pipe $n$ to the distributer, thus completing the circulation.

$y z$ are pipes leading to and from the brine-drums, which supply the apparatus with cooling liquid.

$v$ is a brine-emptying cock, and 5 is a cock to shut off connection with the supply-drums.

Fig. 4 shows an arrangement especially suitable for small installations. In this case the cooling-tower is elevated on a staging 1, and the reservoir $p$ for the cooling liquid is made to contain the evaporator. The cooling liquid will drain from the tower into the reservoir $p$ through a pipe $o$, as in the arrangement shown in Fig. 1.

Where the space overhead is not sufficient to allow of a high tower, I use two or more shorter towers, as shown in Fig. 5. The air after passing through the first tower enters a trunk 2, which conveys the air to the distributing-chamber of the second tower, and so on if there are more than two towers. The air is finally delivered by a trunk $k$, as in the arrangements above described. The distributing-chambers of the two towers are connected by a pipe 4, having a bend in it, as shown, to form a liquid seal to prevent air passing through said pipe. A pipe $o$, arranged as in Fig. 1, drains the towers. A cock 6, Figs. 3, 4, and 5, is provided to shut off the cooling liquid from the cooling-towers when required, and 7, Fig. 5, is an additional cock to shut off the second tower only of the double arrangement.

The towers in all the arrangements shown are provided with inspection-doors 3.

My improved cooling apparatus can be made quite air-tight and is cheap to manufacture. It occupies a small space having regard to the amount of air that can be cooled by it, and it is extremely efficient in action.

The tower may in some instances be laid on its side, in which case diaphragms are provided to cause the air to take a long passage in passing through the tower.

What I claim is—

In an apparatus for cooling air for refrigerating purposes the combination of a series of towers, a grating in each tower to support pieces of material between which the air to be cooled is passed, an air-distributing chamber in each tower below the grating, a trunk connecting the top of one tower with the air-distributing chamber of the next tower in the series, liquid connections including a bent tube, between the lower portions of the towers, a fan for forcing air through the towers a distributer for delivering cooling liquid on top of the pieces of material in each tower, a receptacle communicating with the air-distributing chamber of the first tower for collecting the cooling liquid, a pump for circulating the cooling liquid and an evaporator-coil in said receptacle, substantially as described.

In testimony whereof I have hereunto set my hand in presence of two subscribing witnesses.

THOMAS DOUGLAS.

Witnesses:
GEORGE HARRISON,
HENRY W. LYNDEN.